(12) United States Patent
Kuehnle et al.

(10) Patent No.: US 11,302,125 B2
(45) Date of Patent: Apr. 12, 2022

(54) INFORMATION-ENHANCED OFF-VEHICLE EVENT IDENTIFICATION

(71) Applicant: Bendix Commercial Vehicle Systems, LLC, Elyria, OH (US)

(72) Inventors: Andreas U. Kuehnle, Villa Park, CA (US); Andre Tokman, San Clemente, CA (US); Mark Muncy, Rancho Santa Margarita, CA (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 0 days.

(21) Appl. No.: 16/526,820

(22) Filed: Jul. 30, 2019

(65) Prior Publication Data

US 2021/0035387 A1  Feb. 4, 2021

(51) Int. Cl.
*G07C 5/08* (2006.01)
*B60R 1/00* (2006.01)
(Continued)

(52) U.S. Cl.
CPC ............ *G07C 5/0866* (2013.01); *B60R 1/00* (2013.01); *G06K 9/00791* (2013.01); (Continued)

(58) Field of Classification Search
CPC .... G07C 5/0866; G07C 5/008; G07C 5/0858; G07C 5/0891; G07C 5/08; G07C 5/00; (Continued)

(56) References Cited

U.S. PATENT DOCUMENTS

| 8,676,428 B2 * | 3/2014 | Richardson .......... G08G 1/0112 701/25 |
| 9,390,625 B2 | 7/2016 | Green et al. |

(Continued)

FOREIGN PATENT DOCUMENTS

| CA | 2 925 145 A1 | 1/2005 |
| CA | 3 018 939 A1 | 11/2017 |

(Continued)

OTHER PUBLICATIONS

Gontscharov et al., "Algorithm development for minor damage identification in vehicle bodies using adaptive sensor data processing", 2$^{nd}$ International Conference on System-Integrated Intelligence: Challenges for Product and Product Engineering, Procedia Technology, vol. 15, 2014, pp. 586-594.

(Continued)

*Primary Examiner* — Dramos Kalapodas
(74) *Attorney, Agent, or Firm* — Crowell & Moring LLP (57) ABSTRACT

A method for transmitting event data from an event detection and reporting system in a vehicle to a backend server includes storing full resolution sensor data in a vehicle buffer memory and subsampling the full resolution sensor data to produce reduced resolution of the sensor data. A vehicle event is detected based on an analysis of the reduced resolution sensor data, and the vehicle event is classified based on the reduced resolution sensor data. A determination is made as to whether the vehicle event is classified as a particular type of event with a minimum degree of confidence. The method then includes transmitting an indication that the vehicle event has not been classified with the minimum degree of confidence when the vehicle event has not been classified with the minimum degree of confidence, and transmitting reduced resolution sensor data for the (Continued)

detected vehicle event when the vehicle event is classified with at least the minimum degree of confidence.

20 Claims, 5 Drawing Sheets

(51) Int. Cl.
    *G07C 5/00*           (2006.01)
    *G08G 1/16*           (2006.01)
    *G06K 9/00*           (2022.01)

(52) U.S. Cl.
    CPC ............. *G07C 5/008* (2013.01); *G08G 1/162* (2013.01); *B60R 2300/108* (2013.01)

(58) Field of Classification Search
    CPC ................ B60R 1/00; B60R 2300/108; G06K 9/00791; G06K 9/00805; G06K 9/00; G08G 1/162; G08G 1/0129; G08G 1/0133; G08G 1/0112; G05D 1/0088; G05D 2201/0213; G06F 15/18; G08B 25/00; B60W 40/10
    See application file for complete search history.

(56) References Cited

U.S. PATENT DOCUMENTS

| | | | |
|---|---|---|---|
| 9,650,007 | B1 | 5/2017 | Snyder et al. |
| 10,747,224 | B2* | 8/2020 | Michalakis ....... B60W 60/0015 |
| 2006/0103513 | A1* | 5/2006 | Ihara ........................ H04M 1/04 |
| | | | 340/435 |
| 2007/0208497 | A1* | 9/2007 | Downs ................. G08G 1/0104 |
| | | | 701/117 |
| 2008/0042409 | A1* | 2/2008 | Breed ................. B60R 21/0134 |
| | | | 280/735 |
| 2008/0071465 | A1* | 3/2008 | Chapman ........... G01C 21/3691 |
| | | | 701/117 |
| 2010/0157061 | A1* | 6/2010 | Katsman ............... G07C 5/0866 |
| | | | 348/149 |
| 2013/0046456 | A1* | 2/2013 | Scofield ............. G01C 21/3423 |
| | | | 701/117 |
| 2013/0345927 | A1 | 12/2013 | Cook et al. |
| 2015/0088335 | A1 | 3/2015 | Lambert et al. |
| 2016/0280131 | A1 | 9/2016 | Carson, Jr. |
| 2018/0204394 | A1 | 7/2018 | Dahl et al. |
| 2018/0224855 | A1 | 8/2018 | Eickhoff et al. |
| 2019/0023208 | A1* | 1/2019 | Boston ............... G06K 9/00308 |
| 2019/0339685 | A1* | 11/2019 | Cella .................. B62D 15/0215 |
| 2019/0339688 | A1* | 11/2019 | Cella ................ G05B 19/41865 |
| 2019/0384291 | A1* | 12/2019 | Michalakis ............ G06N 3/006 |
| 2020/0174464 | A1* | 6/2020 | Cella .................. G05B 23/0283 |

FOREIGN PATENT DOCUMENTS

| | | | | |
|---|---|---|---|---|
| CN | 1506919 | A | | 6/2004 |
| GB | 2486384 | A | * | 6/2012 ............. G07C 5/008 |
| GB | 2486384 | A | | 6/2012 |
| WO | WO-2017195120 | A1 | * | 11/2017 ............... B60R 1/00 |

OTHER PUBLICATIONS

PCT/US2020/043967, International Search Report (PCT/ISA/210 and PCT/ISA/220) dated Sep. 8, 2020, enclosing Written Opinion of the International Searching Authority (PCT/ISA/237) (Eight (8) pages).

International Preliminary Report on Patentability (PCT/IB/326 and PCT/IB/373) and Written Opinion (PCT/ISA/237) dated Feb. 10, 2022 (Six (6) pages).

\* cited by examiner

INFORMATION-ENHANCED OFF-VEHICLE EVENT IDENTIFICATION

FIELD OF THE INVENTION

The invention relates to conducting information-enhanced off-vehicle event identification and, in particular, to automatically transmitting enhanced resolution sensor data in response to determining an on-vehicle classification with less than a minimum degree of confidence.

BACKGROUND

Current methods of identifying vehicle and driver events are either carried out by an on-vehicle classifier or by a backend server-based event classifier. However, each approach has inherent drawbacks. For example, with known on-vehicle processing systems there are often times when the sensor and environmental data is quite complex and the occurrence of an event is not easily classifiable. In these cases, a level of computational power is required that is impractical or overly costly to have on-vehicle.

Conversely, backend server-based event classifiers suffer from the inefficiencies and overhead associated with having to carry out regular and potentially large data transmissions between the vehicle and server. Furthermore, the vehicle may not be in current communication with the server, and requesting more data may be unreliable.

As such, there is a need in the art for a system and method that overcomes the aforementioned drawbacks.

SUMMARY OF THE INVENTION

In one embodiment of the invention, an event detection and reporting system in a vehicle includes one or more sensors configured to capture data, a wireless transceiver, a buffer memory, and a processor that is configured to receive sensor data from the sensors, store full resolution sensor data in the buffer memory, and subsample the full resolution sensor data to produce reduced resolution sensor data. The processor is also configured to detect and classify, based on an analysis of the reduced resolution sensor data, a vehicle event, and to determine if the vehicle event is classified as a particular type of event with a minimum degree of confidence. If the detected vehicle event is determined to be a particular type of event with less than the minimum degree of confidence, then the processor transmits to a backend server an indication that the vehicle event has not been classified with the minimum degree of confidence. If, on the other hand, the detected vehicle event is determined to be a particular type of event with at least the minimum degree of confidence, then the processor transmits to a backend server the reduced resolution sensor data.

Other objects, advantages and novel features of the present invention will become apparent from the following detailed description of one or more preferred embodiments when considered in conjunction with the accompanying drawings.

DESCRIPTION OF EXEMPLARY EMBODIMENTS OF THE INVENTION

In the following description of the present invention reference is made to the accompanying figures which form a part thereof, and in which is shown, by way of illustration, exemplary embodiments illustrating the principles of the present invention and how it is practiced. Other embodiments can be utilized to practice the present invention and structural and functional changes can be made thereto without departing from the scope of the present invention In certain embodiments, the invention may be implemented, in part or in whole, by an on-vehicle event detection and reporting system that may include one or more forward facing cameras that are configured such that the field of view of the camera(s) captures the scene ahead of the vehicle from, for example, the perspective of a driver of the vehicle. Also, one or more driver facing cameras may be used to capture a view of the driver of the vehicle, and/or a view of other areas of the cabin, as the driver controls the vehicle while driving. Still other embodiments may include cameras configured to capture other scenes relative to the vehicle. For instance, embodiments may include cameras configured to capture the scene behind the vehicle, to either side of the vehicle, etc.

The event detection and reporting system may be further configured to collect and provide non-video data, including non-video event-based data corresponding to a detected driving or vehicle event that occurred at a particular point in time during a driving excursion. Such event-based data can include data collected from sensors and components of, or sensor and components interacting with, the event detection and reporting system.

These sensors and components can measure, in real time, physical and/or environmental conditions associated with driving and/or vehicle-related events that happen over the course of a driving excursion. The sensors and components can report such physical and/or environmental conditions to the event detection and reporting system, which in turn is configured to classify the driving and/or vehicle-related events corresponding to the measured conditions. Examples of events that may be classified by the event detection and reporting system in real time based on measured physical and/or environmental conditions include, for example and without limitation, excessive acceleration, excessive braking, exceeding speed limit, excessive curve speed, lane departure, lane change without turn signal, loss of video tracking, LDW system warning, following distance alert, forward collision warning, collision mitigation braking, excessive or inappropriate backing speed, etc.

In accordance with an embodiment, the event detection and reporting system may use data collected directly from vehicle components (e.g., devices, sensors, or systems), and data collected from an analysis of vehicle video and/or audio, to classify events and generate event datasets that correspond in time with one or more detected driving events. Event data generated for a detected event may be associated with captured video frames whose timeline spans or overlaps the time when the event was detected/collected. Event data generated from an event determined from processing of captured vehicle video may at least be associated with the video from which it was generated, but may also be associated with other captured video frames whose timelines span or overlap the time when the event was detected/collected (in these scenarios, the time may be calculated based on the video frame or frames from which the event object was derived).

The particular invention disclosed and claimed herein relates to a system and method for transmitting event data from an event detection and reporting system in a vehicle to a backend server. As detailed below, full resolution sensor data is stored in a buffer memory of the vehicle, and is also down- or sub-sampled to produce reduced resolution of the sensor data. A vehicle event can then be detected and classified based on an analysis of the reduced resolution sensor data. Reduced resolution sensor data is often sufficient to reasonably confidently establish the type(s) of events that occurred, though not always, and therefore the transmission of enhanced resolution data is unnecessary.

Only when the vehicle event cannot be classified with at least some minimum degree of confidence, is the enhanced resolution sensor data transmitted to the backend server for further analysis and event classification. Otherwise, only the reduced resolution sensor data need be transmitted, along with the event classification determined by the vehicle.

Figure 1:
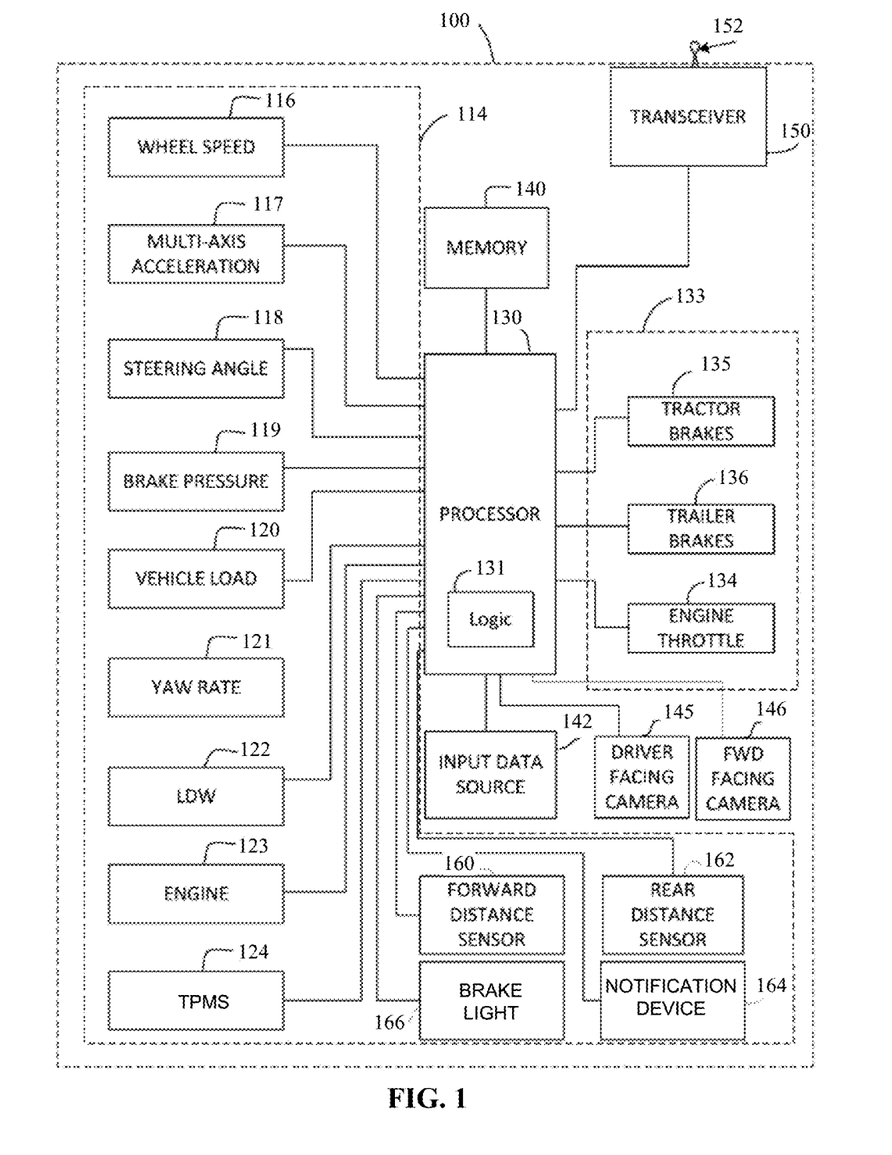
FIG. 1 is a block diagram that illustrates one embodiment of a vehicle-based computer system configured to implement one or more aspects of the invention.

Referring first to FIG. 1, by way of overview a schematic block diagram is provided illustrating details of an event detection and reporting system configured to be used in accordance with one or more exemplary embodiments of the invention. The in-vehicle event detection and reporting system 100 may be adapted to detect a variety of operational parameters and conditions of the vehicle and the driver's interaction therewith and, based thereon, to determine if a driving or vehicle event has occurred (e.g., if one or more operational parameter/condition thresholds has been exceeded). Data related to detected events (i.e., event data) may then be stored and/or transmitted to a remote location/server, as described in more detail below.

The event detection and reporting system 100 of FIG. 1 may include one or more devices or systems 114 for providing input data indicative of one or more operating parameters or one or more conditions of a commercial vehicle. Alternatively, the event detection and reporting system 100 may include a signal interface for receiving signals from the one or more devices or systems 114, which may be configured separate from system 100. For example, the devices 114 may be one or more sensors, such as but not limited to, one or more wheel speed sensors 116, one or more acceleration sensors such as multi-axis acceleration sensors 117, a steering angle sensor 118, a brake pressure sensor 119, one or more vehicle load sensors 120, a yaw rate sensor 121, a lane departure warning (LDW) sensor or system 122, one or more engine speed or condition sensors 123, and a tire pressure (TPMS) monitoring system 124. The event detection and reporting system 100 may also utilize additional devices or sensors in the exemplary embodiment including for example a forward distance sensor 160 and a rear distance sensor 162 (e.g., radar, lidar, etc.). Other sensors and/or actuators or power generation devices or combinations thereof may be used of otherwise provided as well, and one or more devices or sensors may be combined into a single unit as may be necessary and/or desired.

The event detection and reporting system 100 may also include brake light(s) 166 and/or notification device 164, and may be usable to provide headway time/safe following distance warnings, lane departure warnings, and warnings relating to braking and or obstacle avoidance events.

The event detection and reporting system 100 may also include a logic applying arrangement such as a controller or processor 130 and control logic 131, in communication with the one or more devices or systems 114. The processor 130 may include one or more inputs for receiving input data from the devices or systems 114. The processor 130 may be adapted to process the input data and compare the raw or processed input data to one or more stored threshold values or desired averages, or to process the input data and compare the raw or processed input data to one or more circumstance-dependent desired value.

The processor 130 may also include one or more outputs for delivering a control signal to one or more vehicle systems 133 based on the comparison. The control signal may instruct the systems 133 to provide one or more types of driver assistance warnings (e.g., warnings relating to braking and or obstacle avoidance events) and/or to intervene in the operation of the vehicle to initiate corrective action. For example, the processor 130 may generate and send the control signal to an engine electronic control unit or an actuating device to reduce the engine throttle 134 and slow the vehicle down. Further, the processor 130 may send the control signal to one or more vehicle brake systems 135, 136 to selectively engage the brakes (e.g., a differential braking operation that may be used to steer). A variety of corrective actions may be possible and multiple corrective actions may be initiated at the same time.

The event detection and reporting system 100 may also include a memory portion 140 for storing and accessing system information, such as for example the system control logic 131. The memory portion 140, however, may be separate from the processor 130. The sensors 114 and processor 130 may be part of a preexisting system or use components of a preexisting system.

The event detection and reporting system 100 may also include a source of input data 142 indicative of a configuration/condition of a commercial vehicle. The processor 130 may sense or estimate the configuration/condition of the vehicle based on the input data, and may select a control tuning mode or sensitivity based on the vehicle configuration/condition. The processor 130 may compare the operational data received from the sensors or systems 114 to the information provided by the tuning.

In addition, the event detection and reporting system 100 is operatively coupled with one or more driver facing imaging devices, shown in the example embodiment for simplicity and ease of illustration as a single driver facing camera 145 that is trained on the driver and/or trained on the interior of the cab of the commercial vehicle. However, it should be appreciated that one or more physical video cameras may be disposed on the vehicle such as, for example, a video camera on each corner of the vehicle, one or more cameras mounted remotely and in operative communication with the event detection and reporting system 100 such as a forward facing camera 146 to record images of the roadway ahead of the vehicle. In the example embodiments, driver data can be collected directly using the driver facing camera 145 in accordance with a detected driver head position, hand position, or the like, within the vehicle being operated by the driver. In addition, driver identity can be determined based on facial recognition technology and/or body/posture template matching.

Still yet further, the event detection and reporting system 100 may also include a transmitter/receiver (transceiver) module 150 such as, for example, a radio frequency (RF)

transmitter including one or more antennas 152 for wireless communication of the automated control requests, GPS data, one or more various vehicle configuration and/or condition data, or the like between the vehicles and one or more destinations such as, for example, to one or more backend servers. The transmitter/receiver (transceiver) module 150 may include various functional parts of sub portions operatively coupled with a platoon control unit including for example a communication receiver portion, a global position sensor (GPS) receiver portion, and a communication transmitter. For communication of specific information and/or data, the communication receiver and transmitter portions may include one or more functional and/or operational communication interface portions as well.

The processor 130 is operative to combine selected ones of the collected signals from the sensor systems described above into processed data representative of higher level vehicle condition data such as, for example, data from the multi-axis acceleration sensors 117 may be combined with the data from the steering angle sensor 118 to determine excessive curve speed event data. Other hybrid event data relatable to the vehicle and driver of the vehicle and obtainable from combining one or more selected raw data items from the sensors includes, for example and without limitation, excessive braking event data, excessive curve speed event data, lane departure warning event data, lane departure event data, lane change without turn signal event data, loss of video tracking event data, LDW system disabled event data, distance alert event data, forward collision warning event data, haptic warning event data, collision mitigation braking event data, ATC event data, ESC event data, RSC event data, ABS event data, TPMS event data, engine system event data, average following distance event data, average fuel consumption event data, average ACC usage event data, and late speed adaptation (such as that given by signage or exiting).

The event detection and reporting system 100 of FIG. 1 is suitable for executing embodiments of one or more software systems or modules that perform vehicle brake strategies and vehicle braking control methods according to the subject application. The example event detection and reporting system 100 may include a bus or other communication mechanism for communicating information, and a processor 130 coupled with the bus for processing information. The computer system includes a main memory 140, such as random access memory (RAM) or other dynamic storage device for storing instructions and loaded portions of the trained neural network to be executed by the processor 130, and read only memory (ROM) or other static storage device for storing other static information and instructions for the processor 130. Other storage devices may also suitably be provided for storing information and instructions as necessary or desired.

Instructions may be read into the main memory 140 from another computer-readable medium, such as another storage device of via the transceiver 150. Execution of the sequences of instructions contained in main memory 140 causes the processor 130 to perform the process steps described herein. In an alternative implementation, hard-wired circuitry may be used in place of or in combination with software instructions to implement the invention. Thus implementations of the example embodiments are not limited to any specific combination of hardware circuitry and software.

Figure 2:
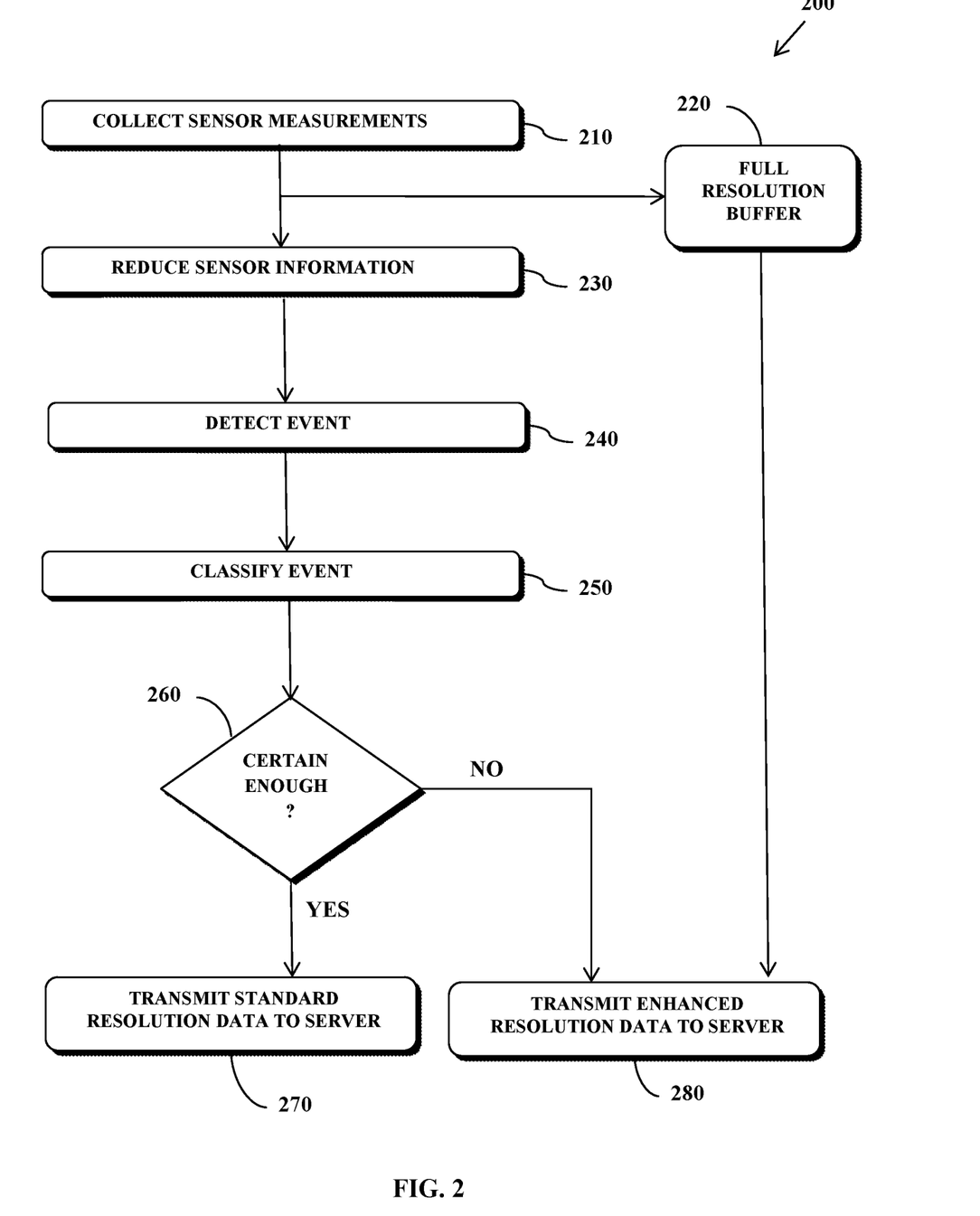
FIG. 2 illustrates one embodiment of a process for implementing one or more aspects of the invention.

Referring now to FIG. 2, a process 200 is depicted for operating an event detection and reporting system (e.g., system 100 of FIG. 1) in accordance with the principles of the invention. Operation begins at block 210 with the event detection and reporting system collecting sensor measurements and related data, such as from devices or systems 114 described above. This data may then be provided for storage in an on-vehicle full resolution buffer at block 220.

At block 230, process 200 continues where the collected data from block 210 is combined and down- or sub-sampled. For example, camera images may be MPEG compressed and stored at only 5 Hz, while accelerometer signals may be down-sampled from the frequency at which they were collected (e.g., 100 Hz), while radar information may be examined at only a reduced resolution (e.g., 10 Hz). The benefit of down- and sub-sampling the collected data is that fewer on-vehicle resources are required to effectively process the information.

Based on the down- or sub-sampled sensor data, a driver or vehicle event may be detected at block 240. As noted above, a driver or vehicle event may be detected in response to the collected sensor measurements exceeding one or more operational parameters or thresholds, or which otherwise satisfy one or more pre-defined conditions, any of which may be stored on the vehicle.

Thereafter, an on-vehicle classification operation is carried out at block 250. Even when the sensor data is analyzed at a reduced resolution, it is still often possible to identify what class of event is occurring by comparing the collected sensor measurements to stored values or conditions that are known to otherwise correspond to specific types of events. As noted above, examples of events that may be classified by the event detection and reporting system in real time based on measured physical and/or environmental conditions include, for example and without limitation, excessive acceleration, excessive braking, exceeding speed limit, excessive curve speed, lane departure, lane change without turn signal, loss of video tracking, LDW system warning, following distance alert, forward collision warning, a non-compliance with a traffic sign or signal, a low clearance, collision mitigation braking, etc.

However, occasionally there may be some uncertainty associated with the data, such as when the sensor data is complex, noisy, or unreliable, such that a further, more comprehensive and detailed analysis is required in order to classify the event, at least within some degree of confidence.

One such example is when the vehicle crosses railroad tracks. Such an event may be detected by three sensors—first by radar, if the tracks protrude high enough over the roadway, then by video, as transverse line pair(s) crossing the path of travel, and finally, by the accelerometer. This complex set of sensor data can be confusing for an on-vehicle event detector. However, if one could measure their ever decreasing range via radar, ascertain their presence and approach via video, and register the characteristic vertical acceleration time gap as they are driven over, then this sometimes confusing occurrence may be identified. The issue is that this type of more complex, longer time scale, multi-signal, sensor-coupled analysis may need to be done by more powerful processor than what is otherwise present on the vehicle. A similar multi-sensor signal sequence also may occur with potholes, which may be seen by the camera before they are traversed. Rough roads with shadows may produce similarly confusing multi-sensor data, whereby measurements may indicate that an event is occurring, yet there is no actual event of interest with respect to driver scoring or safety.

Thus, one aspect of the on-vehicle classification operation of the present disclosure is to determine if the classification operation can be carried out with a sufficiently high degree of confidence, examples of which are described below with reference to FIG. 3. To that end, at block 260 the process 200 determines if a degree of confidence of the classification operation of block 250 exceeds a minimum threshold. If so, process 200 continues to block 270 where the standard resolution data (i.e., the down- or sub-sampled data), along with the determined event classification, may be wirelessly transmitted to a backend server.

If, on the other hand, it is determined at block 260 that the classification operation 250 has not yielded a sufficiently high degree of confidence, the driving or vehicle event may be classified as 'OTHER' or 'UNSURE,' or any other similar designation to indicate that further analysis is needed. A corresponding flag or similar indication may then be transmitted to the backend server, which indicates that the vehicle may be subsequently transmitting (automatically) additional information (or enhanced resolution data) to be analyzed by the more powerful resources available to the backend server in order to complete the classification operation. Alternatively, a more powerful classifier than that which can be executed on the vehicle instead may be executed on a backend server, using only the standard resolution data. That is, a 'help me out here' flag may be sent from the vehicle, along with just the standard resolution data or, a 'help me out here, and use this additional information' flag may be sent. This enhanced information, may not only include more often sampled radar, accelerometer and vehicle control data, but may also include higher resolution video and/or data from additional sensors. It should be appreciated that some of this data may normally not be sent to all, e.g., video from surrounding view camera, auxiliary accelerometer data, individual wheel rotational speeds, etc. The additional data may also (or instead) consist of data spanning a longer period of time, before and/or after the detected event. To that end, the initial flag, and then optionally enhanced resolution data or extended data (e.g., data spanning a longer period of time before and/or after the detected vehicle event as compared to the reduced resolution sensor data) is transmitted to the backend server at block 280 for subsequent classification processing.

It should be appreciated that the enhanced or additional data may be automatically sent when the proscribed degree of certainty for on-vehicle classification of the event is not met at block 260. As such, no request need be sent from the backend server (no 'pull') in order for the additional content to be provided by the vehicle.

Figure 3:
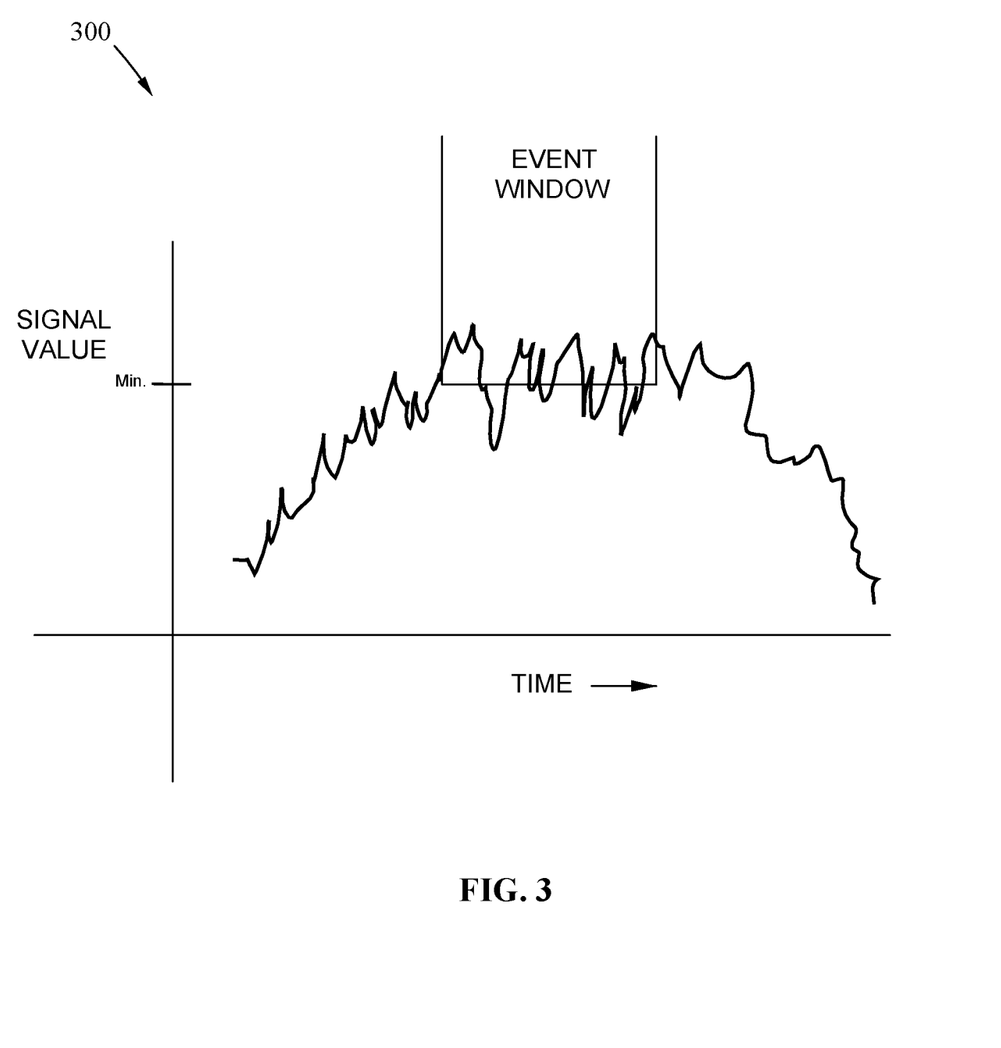
FIG. 3 is a graph illustrating how signal noise can influence the ability of an event to be detected.

As shown in graph 300 of FIG. 3, the degree of confidence applied to an on-vehicle classification operation, such as the operation carried out at block 250 of FIG. 2, may be influenced by signal noise. In the case of FIG. 3, signal noise is impacting the signal value over time, including leading up to and within the event window. As such, the degree of confidence of the on-vehicle classification operation may be based on whether or not some minimum threshold is satisfied. For example, if a signal continuously exceeds a threshold for a length of time, one may declare an event with high confidence. If the signal exceeds the threshold for, say, 80% over the same length of time, one might also declare an event, though now with a lower confidence. Similarly, a video recording may have multiple same-side lane markings visible, one of which triggers a lane departure warning event. However, it would still be unclear if the proper marking (i.e., the outermost marking) triggered the LDW warning, or whether it was the inner marking. Alternatively, perhaps a marking was unreliably extended, as may be the case for gaps in dashed lane markings, even without a marking present. Finally, signal loss may be experienced for a short period, even though both of the adjoining segments are within the event window/threshold, thereby raising doubts as to whether the event has occurred or not. In each of these cases, a confident event classification is less possible and further analysis is warranted.

Event classification typically examines the time history of signal values. A simple classifier might look, for example, if a signal value has exceeded a single threshold for sufficiently many time steps, declaring an event if this is the case. The output of this rule is a Boolean event or not event label.

Figure 4:
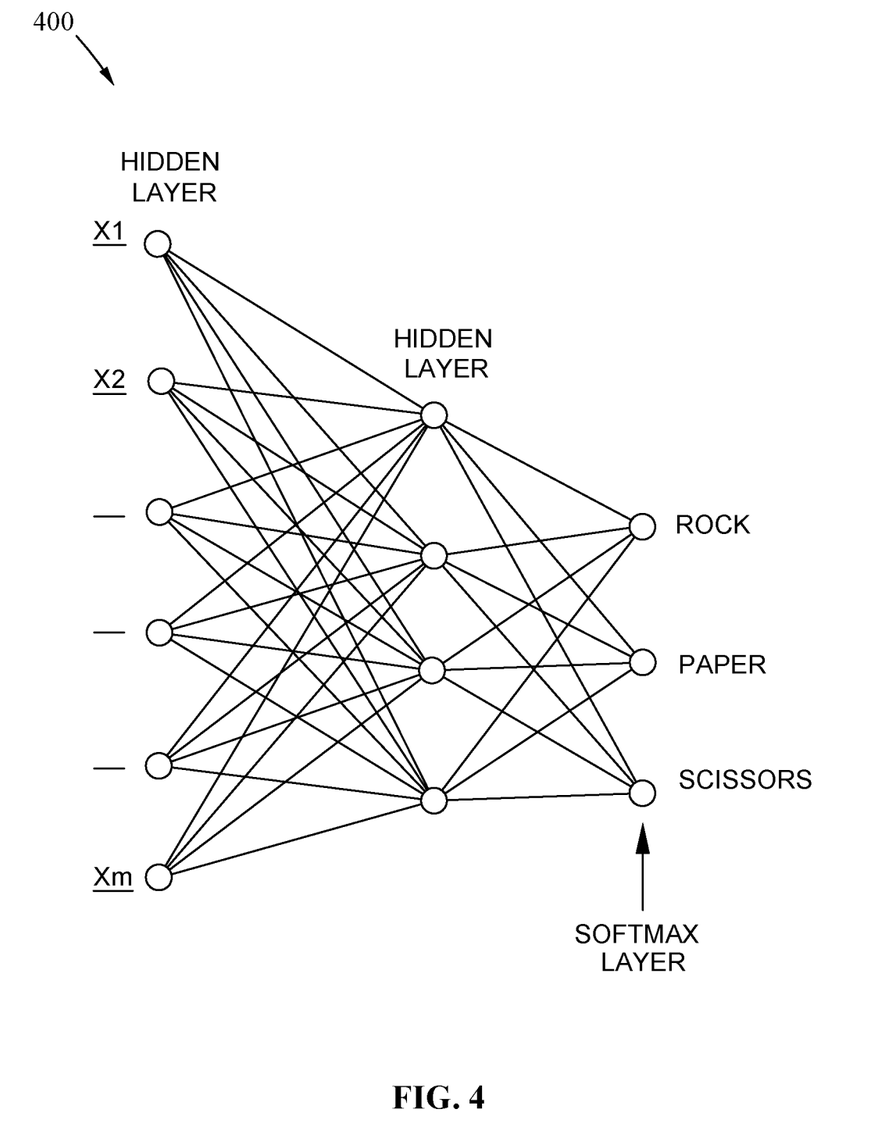
FIG. 4 is a simplified illustration of a neural network configured for use in connection with the principles of the invention.

A more descriptive output may be realized with a neural network, such as the simplified illustration of neural network 400 shown in FIG. 4. This network 400 can have multiple outputs, each corresponding to an event type (i.e., rock, paper, scissors). A series of signal values, x1, x2 . . . Xm, . . . may be fed to the network 400, which examines this and determines if an event has occurred. An event might be determined to be of the regular or severe type, or perhaps be characterized by 'safe, necessary swerve' rather than 'unintended lane departure' and removed as being irrelevant to scoring. The probability, or degree of match to the various different event definitions, is indicated by a series of output nodes (i.e., rock, paper, scissors). These values are typically normalized so that they sum to 1.0 (e.g. a Softmax layer). The output node which exceeds a required confidence level could be taken as the proper event label. If no output node exceeds the required confidence level, further analysis may be required.

Figure 5:
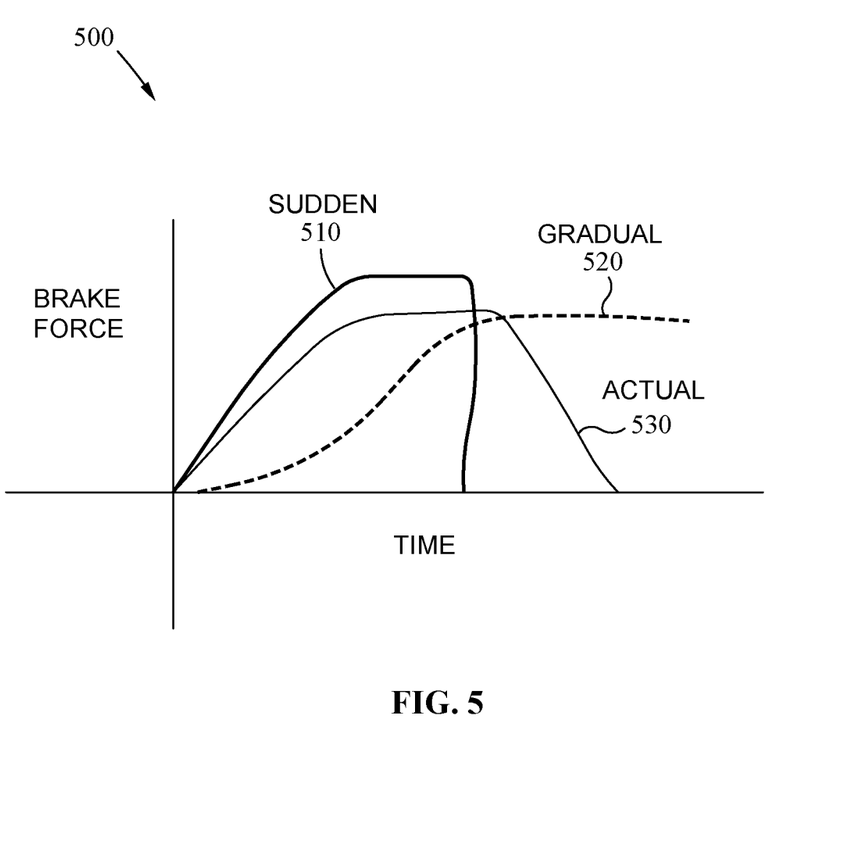
FIG. 5 is a graph illustrating different braking profiles and how an actual braking event may compare.

Another scenario in which event classification may be uncertain is in the context of using nearness to signal profiles to evaluate an event type. For example, FIG. 5 depicts two different braking profiles defined by the braking force applied as a function of time. Profile 510 corresponds to a sudden braking event, while profile 520 corresponds to a gradual braking event. However, when the actual measured braking profile is profile 530, it may not be possible to confidently categorize the braking as either sudden or gradual, at least not without analyzing addition data or enhanced resolution data. That is, because the actual signal profile is somewhere between the sudden and gradual profiles, it may be unclear which is the better characterization. For example, the probability that it is a sudden event might be 60% and a gradual event 40%, corresponding to the best label being 'sudden event', though with a not particularly high confidence. Further examination of the video for this event is probably warranted.

Another example of where additional or enhanced resolution data may be helpful to achieve a confident event classification is in the context of road surface quality measurements, e.g. smooth ice or rough pavement, which may be felt as a low-frequency vibration, or the lack thereof, by the driver. Excessive smoothness or low friction may have caused the wheels to enter Electronic Stability Control (ESC) mode during braking, or perhaps an excessively rough pavement triggered a vertical acceleration event. In these cases, the full sampling rate accelerometer signals and/or high resolution video can useful for further analysis of a hard braking situation or even automatic control situations, where unexpectedly large dynamic events may occur. As such, a full resolution ring buffer of accelerometer values may be used to preserve enhanced data for certain classes of vehicle events, which can then automatically be provided to a backend server when the on-vehicle classification operation does not determine the event type with a sufficient degree of confidence, as described above with reference to the process of FIG. 2. Radar measurements may be similarly stored in a ring buffer fashion, and transmitted to a backend server only when needed, i.e., when the on-vehicle classification operation does not determine the event type with a sufficient degree of confidence. It should further be appreciated that the additionally transmitted data may correspond to a period of time extending further back in time before the detected event than would otherwise be the case.

Finally, camera images and video typically account for most of the volume of data being transmitted from the vehicle to the backend server. As such, sending additional imagery should be done selectively, especially if data transmission is expensive, time-constrained, or location-limited. An information-enhanced record could store and transmit additional image data at a higher time sampling rate, for example, or as only partial images. For instance, just a high resolution, upper left quarter, or left half, of the image when a sudden vehicle deviation to the right was detected might be sent. This additional information, which is selected as it is more likely to be relevant to understanding the particular event, may then be evaluated using the additional processing resources available to the backend server, including for example server-side machine learning methods.

It should further be appreciated that a detected event may actually correspond to more than one event. For example, we may have an LDW and a collision mitigation braking at or near the same time, but the on-vehicle system may otherwise be unable to detect them as different events, or otherwise classify them with a sufficiently high degree of confidence. In such an instance, the on-vehicle event detection and reporting system would, in accordance with the methodology described above with reference to FIG. 2, transmit enhanced resolution data to the backend server, which could in turn properly detect that multiple events had occurred and then classify each accordingly. The backend server may also be able to elaborate on whether the driver responded properly—in a timely, correctly judged, appropriately controlled manner.

It should still further be appreciated that the server-based classification of uncertain events allows for a more finely labeling of the event type. For instance, braking force profiles over time correlate well with the causes thereof, e.g. a soon turning red light, a cut-in, inattention, etc. One aspect of this determination is to determine exactly when the braking started and the precise shape of the braking pressure curve. From this curve, the backend server could correctly determine whether the driver stomped on the brakes, gradually applied pressure, engaged in an associated steering maneuver, etc. Such sophisticated analysis is generally unavailable or impractical to be carried out by an on-vehicle event classification system. Also, the higher time resolution of multiple signals may also eliminate or at least diminish the need to transmit and analyze video data, which is much more cumbersome to both transmit and analyze than non-video data. That is, we may transmit situation dependent, information enhanced data, appropriate for reliable event classification, e.g. not requiring additional or better video, but sending more deceleration data, and thereby resolving what happened. A look up table—e.g. 'send the following additional data when unsure of this event type'—may determine what sort of additional information shall be sent for this uncertain event.

The above server-side analysis may be carried out using the above-described enhanced information that is automatically provided by the on-vehicle system when an event has not been classified with a sufficient confidence level, or when some event-based characteristic is otherwise indeterminate by the on-vehicle system. As a result, an overall superior level of classification is realized, while at the same time minimizing the amount of data transmission required by the vehicle. The server-side analysis, as described in an example above, may also determine that an event detected on-vehicle, though not with sufficient certainty, is in fact not germane to the driver score, and remove this or set its scoring related weight to zero.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

The term "server" or "backend server" means a functionally-related group of electrical components, such as a computer system that may or may not be connected to a network and which may include both hardware and software components, or alternatively only the software components that, when executed, carry out certain functions. The "server" or "backend server" may be further integrated with a database management system and one or more associated databases.

In accordance with the descriptions herein, the term "computer readable medium," as used herein, refers to any non-transitory media that participates in providing instructions to the processor 130 for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like.

In addition and further in accordance with the descriptions herein, the term "logic," as used herein, with respect to FIG. 1, includes hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An event detection and reporting system in a vehicle, the system comprising:
   one or more sensors configured to capture data;
   a wireless transceiver;
   a buffer memory; and
   a processor, coupled to the one or more sensors and the buffer memory, wherein the processor is configured to:
     receive sensor data from the one or more sensors;
     store full resolution sensor data in the buffer memory;
     down- or sub-sample the full resolution sensor data to produce reduced resolution sensor data;
     detect, based on an analysis of the reduced resolution sensor data, a vehicle event that is occurring or has occurred;
     classify the vehicle event, based on the reduced resolution sensor data, as a particular type of event, detected in response to a signal value, corresponding to a set of the reduced resolution sensor data within an event window, exceeding one or more thresholds, and with an associated degree of confidence in the classification of the event as the particular type of event;
     determine if the degree of confidence is at least a minimum degree of confidence;
     transmit, via the wireless transceiver to a backend server and in response to determining that the vehicle event has not been classified with the minimum degree of confidence, an indication that the vehicle event has not been classified with the minimum degree of confidence; and
     transmit, via the wireless transceiver to the backend server, the reduced resolution sensor data corresponding to the detected vehicle event in response to determining that the vehicle event is the particular type of event with at least the minimum degree of confidence.

2. The event detection and reporting system of claim 1, wherein the one or more sensors comprises a camera, and the sensor data comprises both video data and non-video data.

3. The event detection and reporting system of claim 1, wherein in addition to said indication, the processor is further configured to automatically transmit enhanced resolution data or additional data to the backend server in response to determining that the vehicle event is the particular type of event with less than the minimum degree of confidence.

4. The event detection and reporting system of claim 1, wherein the processor is configured to detect the vehicle event by comparing the reduced resolution sensor data to one or more operational thresholds or conditions for the vehicle.

5. The event detection and reporting system of claim 1, wherein the particular event type comprises one or more of an excessive acceleration, an excessive braking, an exceeding speed limit, an excessive curve speed, a lane departure, a lane change without turn signal, a loss of video tracking, a lane departure system warning, a following distance alert, a forward collision warning, a non-compliance with a traffic sign or signal, a low clearance, and a collision mitigation braking.

6. The event detection and reporting system of claim 1, wherein the vehicle event is classified as being the particular type of event only when the minimum degree of confidence is exceeded.

7. The event detection and reporting system of claim 1, wherein the indication that the vehicle event has not been classified with the minimum degree of confidence further comprises an indication that enhanced resolution data or additional data will be automatically transmitted from the event detection and reporting system to the backend server.

8. The event detection and reporting system of claim 3, wherein the enhanced resolution data or additional data comprises one or more of:
   a higher frequency sampling of the sensor data as compared to the reduced resolution sensor data,
   a higher resolution of video data as compared to the reduced resolution sensor data,
   data spanning a longer period of time before and/or after the detected vehicle event as compared to the reduced resolution sensor data, data not normally transmitted.

9. The event detection and reporting system of claim 3, wherein the enhanced resolution data or additional data is configured to be analyzed by the backend server such that the vehicle event can be classified with a higher confidence than the minimum degree of confidence.

10. A method for transmitting event data from an event detection and reporting system in a vehicle to a backend server, the vehicle having one or more sensors configured to capture data, a wireless transceiver, and a buffer memory, wherein the method is performed by the event detection and reporting system and comprises the acts of:
    receiving sensor data from the one or more sensors;
    storing full resolution sensor data in the buffer memory;
    subsampling the full resolution sensor data to produce reduced resolution sensor data;
    detecting, based on an analysis of the reduced resolution sensor data, a vehicle event that is occurring or has occurred;
    classifying the vehicle event, based on the reduced resolution sensor data, detected in response to a signal value, corresponding to a set of the reduced resolution sensor data within an event window, exceeding one or more thresholds, as a particular type of event, and with an associated degree of confidence in the classification of the event as the particular type of event;
    determining if the degree of confidence is at least a minimum degree of confidence;
    transmitting, via the wireless transceiver to a backend server and in response to determining that the vehicle event has not been classified with the minimum degree of confidence, an indication that the vehicle event has not been classified with the minimum degree of confidence; and
    transmitting, via the wireless transceiver to the backend server, the reduced resolution sensor data corresponding to the detected vehicle event in response to determining that the vehicle event is the particular type of event with at least the minimum degree of confidence.

11. The method of claim 10, wherein the one or more sensors comprises a camera, and the sensor data comprises both video data and non-video data.

12. The method of claim 10, wherein in addition to said indication, the method further comprises transmitting enhanced resolution data or additional data to the backend server in response to said determining that the vehicle event is the particular type of event with less than the minimum degree of confidence.

13. The method of claim 10, wherein detecting the vehicle event comprises comparing the reduced resolution sensor data to one or more operational thresholds for the vehicle.

14. The method of claim 10, wherein the particular event type comprises one or more of an excessive acceleration, an excessive braking, an exceeding speed limit, an excessive curve speed, a lane departure, a lane change without turn signal, a loss of video tracking, a lane departure system warning, a following distance alert, a forward collision warning, a non-compliance with a traffic sign or signal, a low clearance, and a collision mitigation braking.

15. The method of claim 10, wherein the vehicle event is classified as being the particular type of event only when the minimum degree of confidence is exceeded.

16. The method of claim 10, wherein the indication that the vehicle event has not been classified with the minimum degree of confidence further comprises an indication that enhanced resolution data or additional data will be automatically transmitted from the event detection and reporting system to the backend server.

17. The method of claim 12, wherein the enhanced resolution data or additional data comprises one or more of:
 a higher frequency sampling of the sensor data as compared to the reduced resolution sensor data,
 a higher resolution of video data as compared to the reduced resolution sensor data,
 data spanning a longer period of time before and/or after the detected vehicle event as compared to the reduced resolution sensor data,
 data not normally transmitted.

18. The method of claim 12, further comprising:
 analyzing, by the backend server, the enhanced resolution data or additional data, and, based on said analyzing, classifying the vehicle event with a higher confidence than the minimum degree of confidence.

19. A system for classifying vehicle events, the system comprising:
 a backend server configured to wirelessly exchange data with a plurality of vehicle; and
 an event detection and reporting system in a vehicle, of the plurality of vehicle, having one or more sensors configured to capture data, a wireless transceiver, a buffer memory, and a processor, coupled to the one or more sensors and the buffer memory, that is configured to:
  receive sensor data from the one or more sensors,
  store full resolution sensor data in the buffer memory,
  down- or sub-sample the full resolution sensor data to produce reduced resolution sensor data,
  detect, based on an analysis of the reduced resolution sensor data, a vehicle event that is occurring or has occurred,
  classify the vehicle event, based on the reduced resolution sensor data, as a particular type of event, detected in response to a signal value, corresponding to a set of the reduced resolution sensor data within an event window, exceeding one or more thresholds, and with an associated degree of confidence in the classification of the event as the particular type of event,
  determine if the degree of confidence is at least a minimum degree of confidence,
  transmit, via the wireless transceiver to a backend server and in response to determining that the vehicle event has not been classified with the minimum degree of confidence, an indication that the vehicle event has not been classified with the minimum degree of confidence, and
  transmit, via the wireless transceiver to the backend server, the reduced resolution sensor data corresponding to the detected vehicle event in response to determining that the vehicle event is the particular type of event with at least the minimum degree of confidence.

20. The system of claim 19, wherein the backend server is configured to receive, from the event detection and reporting system in the vehicle, enhanced resolution data or additional data, and, based thereon, classify the vehicle event with a higher confidence than the minimum degree of confidence.

* * * * *